(12) United States Patent
Kamiko et al.

(10) Patent No.: US 7,676,631 B2
(45) Date of Patent: Mar. 9, 2010

(54) METHODS FOR OPERATING A CPU HAVING AN INTERNAL DATA CACHE

(75) Inventors: Taro Kamiko, Singapore (SG); Pramod Pandey, Singapore (SG)

(73) Assignee: Infineon Technologies AG, Munich (DE)

( * ) Notice: Subject to any disclaimer, the term of this patent is extended or adjusted under 35 U.S.C. 154(b) by 316 days.

(21) Appl. No.: 10/523,517

(22) PCT Filed: Aug. 5, 2002

(86) PCT No.: PCT/SG02/00176

§ 371 (c)(1),
(2), (4) Date: Feb. 4, 2005

(87) PCT Pub. No.: WO2004/023312

PCT Pub. Date: Mar. 18, 2004

(65) Prior Publication Data

US 2005/0235111 A1 Oct. 20, 2005

(51) Int. Cl.
*G06F 12/00* (2006.01)
*G06F 13/00* (2006.01)
*G06F 13/28* (2006.01)

(52) U.S. Cl. ............................. 711/126; 711/3; 711/141; 711/172

(58) Field of Classification Search ........................ None
See application file for complete search history.

(56) References Cited

U.S. PATENT DOCUMENTS

| | | | | |
|---|---|---|---|---|
| 5,157,780 | A | * | 10/1992 | Stewart et al. ................ 714/31 |
| 5,401,199 | A | * | 3/1995 | Shibata ........................ 440/52 |
| 5,692,149 | A | | 11/1997 | Lee |
| 5,809,531 | A | * | 9/1998 | Brabandt ..................... 711/141 |
| 5,829,038 | A | * | 10/1998 | Merrell et al. .............. 711/143 |
| 6,401,199 | B1 | | 6/2002 | Klein |

FOREIGN PATENT DOCUMENTS

| | | |
|---|---|---|
| EP | 0 535 537 A2 | 4/1993 |
| WO | WO 80/00383 A1 | 3/1980 |

OTHER PUBLICATIONS

Jim Handy, the Cache Memory book, copyright 1998, Academic Press, Inc., second edition pp. 42-49, 196-197.*
Jim Handy, the Cache Memoy book, copyright 1998, Academic Press, Inc., second edition pp. 28, 89-90 and 140.*

* cited by examiner

*Primary Examiner*—Sheng-Jen Tsai
*Assistant Examiner*—Michael Alsip
(74) *Attorney, Agent, or Firm*—Slater & Matsil, L.L.P.

(57) ABSTRACT

A CPU 3 having a processor 1 and an internal data cache 7 IS operated in combination with a dummy interface 13 which simulates the existence of an external memory 17 having the same address space as the cache memory 7 but which does not store data written to it. In this way, a conventional CPU can be operated without read/write access to an external memory in respect of at least part of its memory address space, and therefore with a higher performance resulting from faster memory access and reduced external memory requirements. The CPU 3 may be one of a set of CPU chips 20, 21 in a data processing system, one or more of those chips 20 optionally having read/write access to an external memory 23.

26 Claims, 3 Drawing Sheets

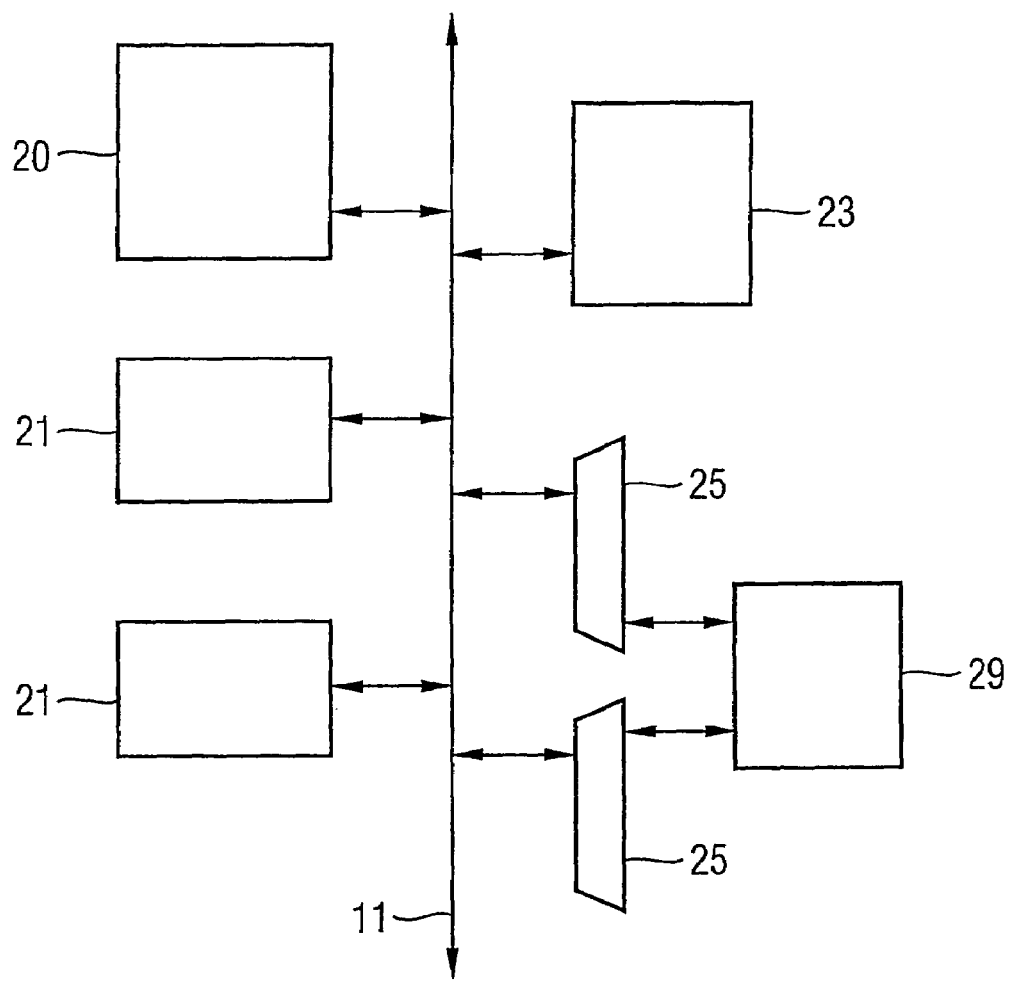

METHODS FOR OPERATING A CPU HAVING AN INTERNAL DATA CACHE

FIELD OF THE INVENTION

The present invention relates to methods for using a CPU cache memory, to chipsets which perform the method, and to devices incorporating those chipsets.

BACKGROUND OF THE INVENTION

Conventionally, a CPU integrated circuit which is a CPU has access to two forms of memory: a first memory ("data cache") within the CPU, and an external memory stored on one or more memory chips. The processor of the CPU is able to access the data cache more quickly than the external memory, but the capacity of the data cache is smaller than that of the external memory, and for many calculations the CPU requires the full capacity of the external memory. For this reason, the data cache is arranged to store a duplicate of the data in the external memory. The processor can then access the data cache when it requires the duplicated data, and the external memory when it requires data which is not duplicated in the internal memory.

The configuration is illustrated in FIG. 1 which shows that when the processor 1 of the CPU 3 needs to access data with a given address it does so via a cache controller 5 which determines whether the data with that address is stored in the data cache 7. If so, the data is read from there. If not, the data is read from external memory 9 (which may take the form of one or more memory chips) using a system bus 11. Once the CPU 3 reads data from the external memory 9, the data will be mirrored in the data cache 7, and the next read access from the same location in the external memory 9 will be skipped and instead the data will be taken from the data cache 7. When the processor writes data into the data cache 7 it is not normally copied into the external memory 9 at once, but instead written into the external memory 9 when the corresponding data in the data cache 7 is going to be replaced. Note that the system of FIG. 1 normally includes an address decoder (not shown) which is involved in passing the signals between the CPU 3 and the external memory 9. This address decoder (not shown) is employed because the external memory 9 may be partitioned, and the address decoder defines a mapping between the address in the CPU memory space and an address in the external memory 9. For example, when the CPU 3 issues a write instruction the decoder converts the output address of the CPU 3 in the memory space of the CPU into the address of the corresponding location in the partitioned external memory 9.

The memory address map of the system of FIG. 1 in the memory space of the CPU is illustrated in FIG. 2. All of this memory corresponds to addresses in the external memory 9 (under the mapping defined by the decoder). The address space includes a "memory" section 4 which the processor 1 employs as the read/write memory for performing its operations (varying portions of this memory space are mirrored in the data cache 7), and a "reserved" section 6 which is an area of memory which is not in fact required for performing calculations.

SUMMARY OF THE INVENTION

The present invention aims to provide a new and useful way of accessing a memory, and a chip set which implements the method.

The present invention is based on the realization that the processes of the computer could be implemented with higher performance if only the memory stored in the data cache is used. For example, in a system in which there are several processors, performance would be improved if one or more of those processors used only their respective internal data caches. This higher performance may result from either or both of faster memory access and reduced external memory requirements.

In general terms, the present invention proposes that a CPU having an internal data cache is operated in combination with a dummy interface which simulates the existence of an external memory having the same address space as the cache memory but which does not store data written to it. In this way, a CPU according to present designs can be operated without the ability to store data in an external memory in respect of at least part of its memory address space.

Specifically, a first expression of the present invention is a data processing system having:

at least one processor chip including a processor unit and an internal data cache, and a dummy interface which receives data written to it by the processor chip, and discards it.

The processor(s) can also be connected, e.g., via the dummy interface, to an external memory chip, which provides data to initialize the data cache.

The at least one processor chip may be one or more of a plurality of processor chips which also includes at least one processor chip having access to an external memory store.

A second expression of the invention is a method of operating a processing chip having a processor, an internal data cache and a cache controller for transmitting write instructions out of the integrated circuit for updating an external memory, the method including discarding the write instructions and arranging for the program code operated by the processor to require only the data cache as memory.

BRIEF DESCRIPTION OF THE FIGURES

An embodiment of the invention will now be described for the sake of illustration only with reference to the following figures, in which:

FIG. 6 shows a system incorporating an arrangement as shown in FIG. 3.

DETAILED DESCRIPTION OF THE EMBODIMENTS

Figure 1:
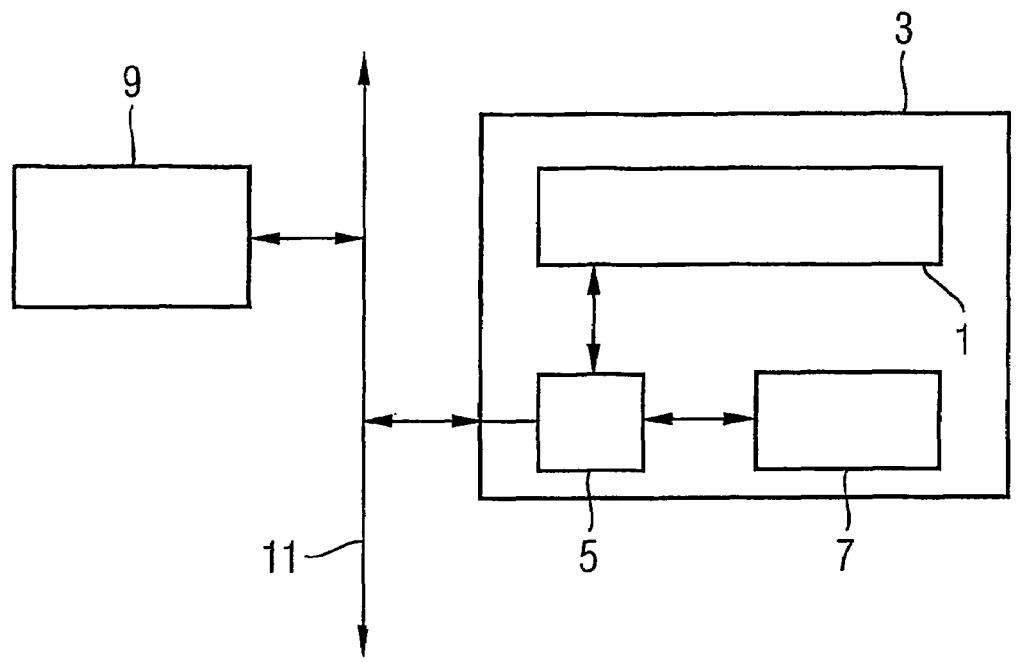
FIG. 1 shows schematically a known data processing system.
Figure 2:
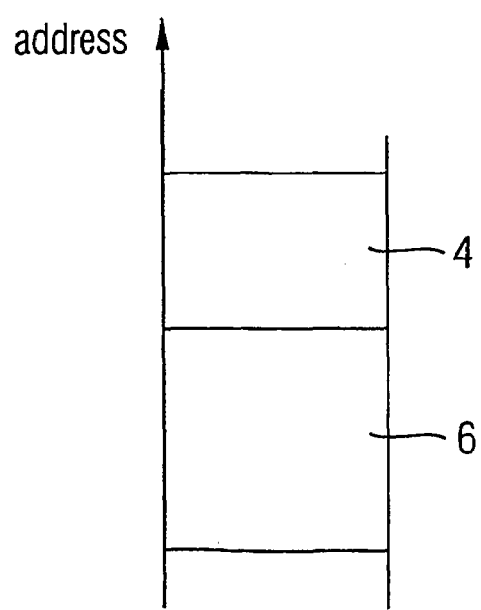
FIG. 2 shows the address map for the system of FIG. 1.
Figure 3:
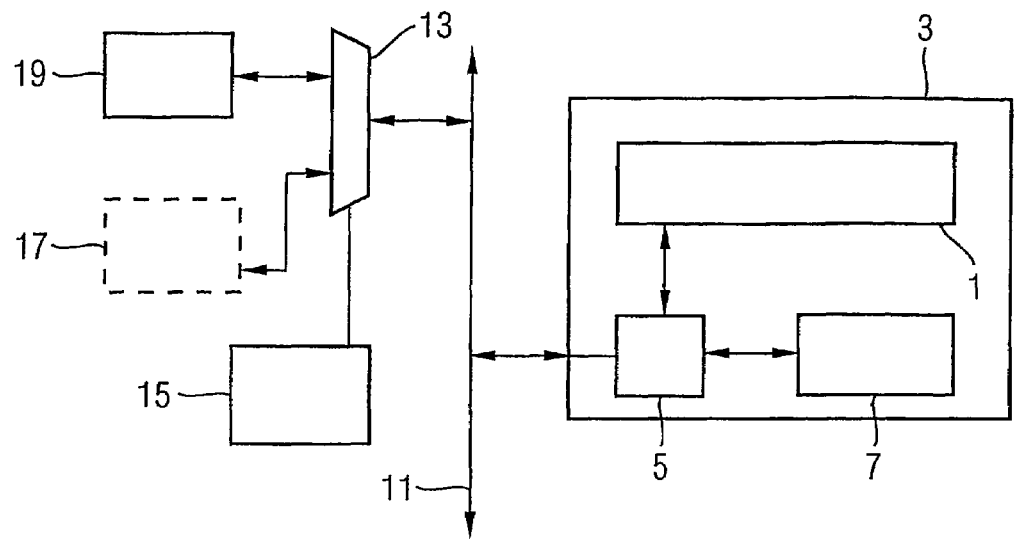
FIG. 3 shows schematically a data processing system according to the present invention.
Figure 4:
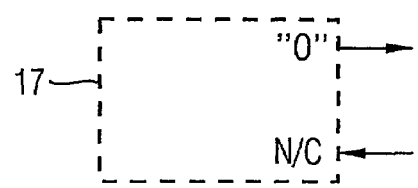
FIG. 4 shows an external memory simulated by the system of FIG. 3.

The embodiment is illustrated in FIG. 3, in which components which may be identical to those shown in FIG. 1 are illustrated by the same reference numerals. As shown in FIG. 3, the data processing system includes a CPU processor chip 3 having an internal processor 1, a cache controller 5 and an internal data cache 7 connected via the system bus 11 to a dummy interface 13. The dummy interface 13 is coupled to a memory 19, and to an address decoder 15.

In an initialization stage, the dummy interface 13 reads data (including program code), which is required to initialize the CPU 3 from the memory 19 into part of the data cache 7.

Subsequently, in operation, the processor 1 operates exactly as in present systems. However, the program code which it runs i.e., the program code uploaded from the memory 19 during the initialization) is such that the amount of memory required by the processor 1 is provided by the data cache 7. The cache controller 5 operates in the conventional manner, performing write operations to the data cache 7 and attempting to keep an (in fact non-existent) external memory 17 updated to mirror what is in the data cache 7 by transmitting write operations to the system bus 11. These write instructions are passed to the dummy interface 13, which simply discards the data it receives.

The address decoder 15 operates in a way similar to that of the prior art decoder discussed above, but with the difference that it never directs read/write commands from the CPU to the external memory 9. Write commands from the CPU 3 are simply discarded by the dummy interface 13 and the decoder 15. In the case that the dummy interface receives a read command from the CPU 3 (as in some embodiments it may do during the initiation procedure), the dummy interface transmits an output which is not dependent on the data which has previously been transmitted to it, e.g., it may always output "0". This feature may be used during an initialization of the data cache 7 in which portions of the memory which are not copied from the external memory 19 may be initialized to zero using values read from the dummy interface 13.

We now analyze the situation from the perspective of the CPU 3. The operation of the CPU is identical to what it would be if the dummy interface were not just discarding data, but instead was a normal interface performing read/write operations to a memory 17, operating as shown in FIG. 3: that is, not storing ("N/C") any data written to it, and always outputting the value "0" in any read operation. In fact, this memory 17 does not exist, but the CPU 3 has no way of "knowing" this.

Since the program code is such that the only memory required is provided by the data cache 7, the processor 1 operates in exactly the same manner as it would in the system of FIG. 1 running the same code. However, the system of FIG. 3 has the advantage that less memory is required, since the external memory 19 of FIG. 3 is only required to store the initialization data and may be smaller than the memory 9 of FIG. 1.

Figure 5:
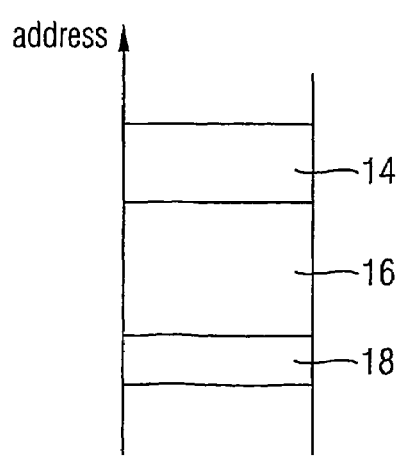
FIG. 5 shows the address map for the system of FIG. 3.

Turning to FIG. 5, the address map for the system is shown. In this case, the memory space of the CPU 3 is entirely defined by the data cache 7. A portion 14 of the data cache stores data, which was read from the external memory 19 during initialization, and this section is not overwritten during the operation of the processor 1. A second portion 16 of the data cache 7 is the read/write area which the processor 1 uses to perform its calculations. A portion 18 of data cache 7 is "reserved", i.e., unused in the operations of the processor 1.

Note that the CPU 3 may be one of a plurality of processing units which are part of the data processing system, such as is shown in FIG. 6 having a master processing unit 20 and a plurality of slave processing units 21. In this case, one or more of the CPU processing units e.g., the master processing unit 20 only) may be provided with an external memory 23, which is kept updated to mirror that processing unit's internal data cache by a conventional method such as that described above in relation to FIG. 1. Other of the CPU processing units (e.g., some or all of the slave processing units 21) may be as discussed above in relation to FIG. 3, i.e., not being able to store data in external memory but instead performing processing only using their internal data caches and transmitting their write instructions to dummy interfaces 25, which discard them. The dummy interfaces initialize the slave processing unit 21 using one or more memory chips 29, which do not store data during the subsequent processing operation. In this way, the overall performance of the system is improved, since fewer read/write memories 23 are required. At the same time, the processing speed of the system is improved since many of the processors (e.g., the slave processing units 21) never need to wait to obtain data from external memories.

In such a system, the only processor chip(s) 20 which are provided with the capacity to read/write data to/from an external memory 23 are the one(s) which require a read/write memory larger than their internal data cache to perform their tasks, and the program code which the full set of processing chips 20, 21 operate is written such that all tasks which require a memory larger than the internal data cache of the CPUs are allotted to those CPU(s) 20 which have access to an external memory.

The invention claimed is:

1. A data processing system having:
at least one processor chip including a processor unit and an internal data cache, and
an interface external to the internal data cache and external to the processor chip, and configured to receive cache mirror data from the processor chip, wherein
the cache mirror data comprises all data written to the internal data cache, and
the interface is further configured to discard all the cache mirror data designated to be written to an external memory received from the processor chip so that the cache mirror data is never written to any external memory during operation of the processor chip.

2. A data processing system according to claim 1 in which the interface is coupled to a memory, the interface passing data to the processor chip during initialization.

3. A data processing system according to claim 1 further including one or more further processing chips which have read/write access to external memory.

4. A method of operating a processing chip having a processor, an internal data cache and a cache controller for transmitting cache mirror data write instructions out of the processing chip, the method including discarding the write instructions designated for an external memory at an interface external to the processing chip so that cache mirror data comprising all data written to the internal data cache is never written to any external memory during operation of the processing chip, the external interface providing a connection between the processing chip and an address controller; and arranging for the program code operated by the processor to require only the data cache as memory.

5. A data processing system according to claim 1 wherein the at least one processor chip comprises exactly one processor chip.

6. A data processing system according to claim 1 wherein the at least one processor chip comprises two processor chips.

7. A data processing system according to claim 1 wherein the processor chip further includes an internal cache controller coupled between the internal data cache and the processor unit.

8. A data processing system comprising:
a processor chip including an internal processor coupled to an internal data cache;
an external memory;
an address decoder; and
an interface external to the internal data cache and external to the processor chip, the interface coupled between the processor chip and the external memory and providing the only connection between the processor chip and the address decoder, wherein the interface is configured to receive memory data from the external memory and transfer the memory data to the processor chip, and the interface is further configured to receive internal data cache mirror data from the processor chip, internal cache mirror data comprising all data written to the internal data cache, and discard all the internal data cache mirror data designated to be written to the external memory so that the internal cache mirror data is never written to any external memory.

9. The system of claim 8 and further comprising a control circuit coupled to the interface, circuit, the control circuit providing a control signal to indicate whether data received by the interface should be discarded.

10. The system of claim 9 wherein the control circuit comprises a decoder.

11. The system of claim 8 and further comprising:

a second processor chip that includes an internal processor coupled to an internal cache; and a second interface, wherein the second processor chip is coupled to the external memory through the second interface.

12. The system of claim 11 and further comprising a system bus coupled to the processor chip, the second processor chip, the interface, and the second interface.

13. The system of claim 12 and further comprising a third processor chip coupled to the system bus.

14. The system of claim 13 wherein the third processor chip comprises a master processing unit and wherein the processor chip and the second processor chip comprise slave processing units.

15. The system of claim 14 and further comprising a second external memory directly coupled to the system bus.

16. A method of operating a data processing system having a plurality of integrated circuits, each integrated circuit having a processor, an internal data cache, and a cache controller, the method comprising:

transmitting first cache mirror data write instructions designated to an external memory interface from a first cache controller of a first integrated circuit, wherein the external memory interface is located outside the first integrated circuit, wherein first cache mirror data write instructions comprise instructions to write first cache mirror data, the first cache mirror data comprising all data written to an internal data cache of the first integrated circuit; and discarding the first cache mirror data write instructions from the first cache controller of the first integrated circuit at the external memory interface so that the first cache mirror data is never written to any external memory during operation of a first processor on the first integrated circuit.

17. The method of claim 16, further comprising:

transmitting second cache mirror data write instructions from a second cache controller in a second integrated circuit to the external memory interface; and writing the second cache mirror data write instructions from the external memory interface to external memory.

18. The method of claim 17, further comprising:

determining if a task requires a read/write memory that is larger than an internal data cache size; and allocating the task to the first integrated circuit or to the second integrated circuit based upon the determining step.

19. The data processing system of claim 1, wherein the cache mirror data is designated to be written to an external memory by a write command from the at least one processor chip to the external memory.

20. The data processing system of claim 1, wherein the cache mirror data is designated to be written to an external memory by transmitting the cache mirror data on an external interface bus coupled to the at least one processor chip and the interface.

21. The method of claim 4, wherein transmitting cache mirror data further comprises transmitting a write command from the processing chip to the external interface to designate the cache mirror data for the external memory.

22. The method of claim 4, wherein transmitting the cache mirror data out of the processing chip comprises transmitting the cache mirror data on an external interface bus coupled between the external interface and the processing chip.

23. The system of claim 8, wherein the internal data cache mirror data is designated to be written to an external memory by a write command from the processor chip to the external memory.

24. The data processing system of claim 8, wherein the internal data cache mirror data is designated to be written to an external memory by transmitting the internal data cache mirror data on a system bus coupled to the processor chip and the interface.

25. The method of claim 16, wherein transmitting the first cache mirror data further comprises transmitting a write command from the first processor on the first integrated circuit to the external interface to designate the first cache mirror data for the external memory.

26. The method of claim 16, wherein transmitting the first cache mirror data out of the first integrated circuit comprises transmitting the cache mirror data on an external interface bus coupled between the external interface and the first integrated circuit.

* * * * *